(12) United States Patent
Boros et al.

(10) Patent No.: US 12,286,803 B2
(45) Date of Patent: Apr. 29, 2025

(54) PRINTING SYSTEM FOR CREATING A CONCRETE SUPPORT STRUCTURE FOR A PASSENGER TRANSPORT SYSTEM

(71) Applicant: INVENTIO AG, Hergiswil (CH)

(72) Inventors: Csaba Boros, Dunajska Streda (SK); Georg Wagenleitner, Rossleithen (AT)

(73) Assignee: Inventio AG, Hergiswil (CH)

( * ) Notice: Subject to any disclaimer, the term of this patent is extended or adjusted under 35 U.S.C. 154(b) by 308 days.

(21) Appl. No.: 17/753,761

(22) PCT Filed: Sep. 1, 2020

(86) PCT No.: PCT/EP2020/074263
§ 371 (c)(1),
(2) Date: Mar. 14, 2022

(87) PCT Pub. No.: WO2021/052742
PCT Pub. Date: Mar. 25, 2021

(65) Prior Publication Data
US 2022/0372776 A1 Nov. 24, 2022

(30) Foreign Application Priority Data

Sep. 16, 2019 (EP) .................................... 19197589

(51) Int. Cl.
*E04G 21/04* (2006.01)
*B33Y 10/00* (2015.01)
(Continued)

(52) U.S. Cl.
CPC .......... *E04G 21/0427* (2013.01); *B33Y 10/00* (2014.12); *B33Y 30/00* (2014.12); *B66B 23/00* (2013.01)

(58) Field of Classification Search
CPC ... B66B 23/00; B28B 1/001; E04G 2021/049; B29C 64/209
See application file for complete search history.

(56) References Cited

U.S. PATENT DOCUMENTS

| 735,920 A | 8/1903 | Franz et al. |
| 7,069,614 B1 * | 7/2006 | Sivachenko ............. E01D 2/00 52/579 |

(Continued)

FOREIGN PATENT DOCUMENTS

| CN | 206233586 U | 6/2017 |
| CN | 107190913 A | 9/2017 |

(Continued)

OTHER PUBLICATIONS

International Search Report and Written Opinion for International Application No. PCT/EP2020/074263 dated Oct. 23, 2020.

(Continued)

*Primary Examiner* — Seyed Masoud Malekzadeh
*Assistant Examiner* — Timothy G Hemingway
(74) *Attorney, Agent, or Firm* — Knobbe, Martens, Olson & Bear, LLP (57) ABSTRACT

The disclosure relates to a printer device as well as a method for building a printer guide structure of a passenger transport system configured as an escalator or moving walkway in an existing building. The printer device comprises at least one printer guide device, a 3D concrete printer device, which is arranged such that it can be moved along the printer guide device, and a printer controller.

9 Claims, 5 Drawing Sheets

(51) Int. Cl.
B33Y 30/00 (2015.01)
B66B 23/00 (2006.01)

(56) References Cited

U.S. PATENT DOCUMENTS

| | | | |
|---|---|---|---|
| 2016/0304322 A1* | 10/2016 | Krampl | B65G 21/00 |
| 2017/0350115 A1* | 12/2017 | Rocher | B33Y 10/00 |
| 2021/0129377 A1* | 5/2021 | Mo | B28B 1/522 |

FOREIGN PATENT DOCUMENTS

| | | | | |
|---|---|---|---|---|
| CN | 107355237 A | * | 11/2017 | E21D 11/102 |
| CN | 107974950 A | * | 5/2018 | E01D 21/00 |
| CN | 108868141 A | * | 11/2018 | |
| CN | 109079955 A | | 12/2018 | |
| CN | 109366684 A | | 2/2019 | |
| CN | 108103952 B | | 5/2019 | |
| DE | 202013101892 U1 | | 10/2013 | |
| JP | H11246158 A | * | 9/1999 | |
| WO | WO-2015165631 A1 | * | 11/2015 | B65G 21/02 |
| WO | WO 2016166116 A1 | | 10/2016 | |
| WO | WO-2018136475 A1 | * | 7/2018 | B22F 10/10 |

OTHER PUBLICATIONS

Construction Engineering Construction Technology and Quality Control, Cai Junxing et al., S. 34, China Building Materials Industry Press, Jun. 2018.

* cited by examiner

PRINTING SYSTEM FOR CREATING A CONCRETE SUPPORT STRUCTURE FOR A PASSENGER TRANSPORT SYSTEM

TECHNICAL FIELD

The disclosure relates to a printer device for creating a concrete structure of a passenger transport system configured as an escalator or moving walkway.

SUMMARY

Passenger transport systems, which are configured as escalators or as moving walkways, are used in buildings in the public sector, for example in train stations, subway stations, airports as well as in shopping malls, cultural centers and the like. Escalators or moving walkways have a supporting structure, which is referred to as a load-bearing structure. Most of the time, this structure is a truss structure, which is manufactured by the manufacturer as a complete unit or divided into load-bearing modules. The load-bearing structure or its load-bearing modules or truss modules are installed into a building with the load-bearing structure connecting two floors of the building, for example. In this load-bearing structure, the movable components of the escalator or moving walkway, for example a step belt or a pallet belt, deflecting axes, a drive shaft and the drive motor with gears, its control, monitoring systems, safety systems and the like, are installed. Furthermore, stationary components such as balustrades, comb plates, support points, tracks and guide rails are also firmly fastened to the load-bearing structure. If the load-bearing structure is subdivided into load-bearing modules, each separation point formed thereby constitutes a considerable increase in material, manufacturing time and assembly time. Therefore, separation points are avoided as much as possible or their number is kept as small as possible, which means that this component with its very large dimensions is transported from the place of manufacture to the place of use. This creates a large transport volume, which causes comparatively high transport costs.

Escalators and moving walkways of the aforementioned type or their modules are therefore large, bulky parts which, because of their structure, cannot be installed into a load-bearing structure as arbitrarily segmented components. As mentioned above, all the components of the escalator are mounted to the load-bearing structure, which supports them at two opposing support points in the structure. In other words, this means that the load-bearing structure extends across the entire planned length of the passenger transport system.

In the case of new structures to be built, the escalators and moving walkways are usually used during the construction process, as soon as their support points established in the building are available, and then the surrounding walls and ceilings of higher floors are constructed. This is because these passenger transportation systems are, for the aforementioned reasons, built into the building as very large components and are so large that it would be difficult to bring them into the building through existing openings.

In the case of existing buildings, however, it is not possible to bring a large escalator or moving walkway into the building without demolishing parts of the building shell, for example the walls, to create openings to bring in the large components. This problem may also present itself in subway stations because tunnels are hewn underground, and the escalators and moving walkways have to be installed in these tunnels.

The transport of such passenger transport systems that are completely assembled in the manufacturing plant and delivered as a whole constitutes another problem. Large trucks have to be used in this case, and the large volume of these systems may mean that traffic routes must be blocked during transport, so certain traffic obstructions have to be accepted.

In order to avoid the problems listed above, passenger transport systems of the aforementioned type are often introduced into the building in a disassembled state and assembled therein. However, there is then the problem that the structure, which is usually configured as a framework and represents the largest part of an escalator or moving walkway, cannot be segmented arbitrarily. Even if the load-bearing structure is delivered disassembled in two or three sections and brought into the building, it is still possible that certain parts of the building's structure must be demolished. In addition, each interface of the load-bearing structure on which the sections are assembled represents considerable additional effort since this interface must be particularly reinforced so that the interface has the same load-bearing capacity as the other parts of the load-bearing structure.

Because of these problems, an object of the present disclosure can be seen in the creation of possibilities for bringing a load-bearing structure into an existing building or structure without parts of the building having to be demolished or without the load-bearing structure having to be brought into the building in sections.

This object is achieved by a printer device and by a method for creating a concrete structure of a passenger transport system configured as an escalator or moving walkway in an existing building. For this purpose, the printer device has at least the components listed below.

The printer device includes a printer guide device, which can be arranged between two support points of the structure provided to support the passenger transport system. In this case, the printer guide device is configured to be supported, at least during the printing process, on the floors of the building in which it is to be connected to the passenger transport system. In other words, the printer guide device is supported, at least during the execution of the printing process, on the floors of the building in which it is to be connected to the concrete structure.

The printer guide device is preferably supported in the area of the support points on the building so that the two support points are basically bridged by the printer guide device. For this purpose, the printer guide device comprises setting means with which the printer guide device can be set to and aligned with the two support points. Because the printer guide device is supported on the floors provided for the connection, it can directly be aligned with the support points without significant effort, which leads to a high manufacturing precision of the concrete structure to be built.

Furthermore, the printer device comprises a 3D concrete printer device, which can be arranged on the printer guide device so as to be movable along said device. The 3D concrete printer device is configured to spatially arrange workable concrete. For this purpose, the 3D concrete printer device comprises at least one printer nozzle, a movement device for moving the printer nozzle and a printer controller. By means of the printer controller, the movement device can control the concrete supply through the printer nozzle as well as the movements of the entire 3D concrete printer device along the printer guide device. Control software is used for said control, which can be run to carry out the printing process while the concrete structure is being built on the printer controller.

As already mentioned at the beginning, the load-bearing structure is the largest component of the passenger transport system. With the device according to the disclosure, this largest part can be built directly in the building. As a result, the transport volume of the passenger transport system from the manufacturer's factory to the building in which the passenger transport system is to be installed and operated can be greatly reduced. The device also achieves a so-called locally manufactured part for domestic companies, which is required for many public contracts. All other components of the passenger transport system can then be installed in the concrete structure, which further increases the local production ratio.

In other words, the printer guide device can be arranged at both support points in a supporting manner. As a result, the 3D concrete printer device can already be clearly positioned in relation to the support locations and can print or build the concrete structure from one support location to the next support location.

Preferably, the setting means also allow the printer guide device to be set so that it follows the approximate extent of the concrete structure. This has the advantage that the printer device as a whole can be built compactly, dimensionally stable and still light since in this way, for example, the 3D concrete printer device does not require long arms of the movement device for guiding the printer nozzle. Here, the term "following the approximate extension of the concrete structure" refers to a longitudinal extension of the concrete structure that approximates the course of the concrete structure to be printed.

In a further embodiment of the disclosure, the printer guide device of the printer device can, after the printing process, be arranged as a reinforcement or part of a reinforcement of the concrete structure in the load-bearing structure. As a result, this part of the printer guide device can already take on a supporting function and support the part of the processed concrete mass that has not yet set. The printer guide device thus does not only fulfill the function of a guide for the 3D concrete printer device but also supports and reinforces the load-bearing structure once it has been completed.

In an alternative embodiment of the disclosure, the printer guide device of the printer device can, of course, also be arranged between the support points temporarily and only for performing the printing process. After the printing process, it is completely removed.

Passenger transport systems such as escalators or moving walkways can also be installed in structures that exist or are built in seismically active areas. The structures erected in earthquake areas are subject to special building regulations and are specially configured for these loads. In order to avoid damage, movements between individual floors of the building can take place relative to one another in the event of an earthquake. In a further embodiment of the present disclosure, therefore, by means of the printing process and possibly including bearing components, a pivot bearing can be formed at one of the two support points and a sliding bearing between the concrete structure and the respective support point at the other support point. This means that the support points require a special printing process so that, for example, additional metal components are integrated into the concrete structure, which then form these support points. The pivot bearing can be configured in such a way that it enables pivoting movements of the passenger transport system about a vertical axis. The sliding bearing at the other support point only supports the passenger transport system against vertical forces at this end, but it can move in all directions on the horizontal plane.

In a further embodiment of the present disclosure, fastening areas for components of the passenger transport system can be generated during the printing process. These fastening areas ensure that components of the passenger transport system that have to be permanently fastened to the concrete structure can be better accommodated without having to drill into the concrete structure, without having to set anchor dowels or without having to carry out other work in order to create suitable fastening areas for further components of the passenger transport system. Furthermore, guide elements for movable components of the passenger transport system can also be generated directly during the printing process. Guide elements such as guide rails, counter-guide rails, deflection guide rails and the like can, in particular, be produced during the printing process. If necessary, these guide elements have to be processed further, for example sanded or by having special layer applied, so that the guides enable the moving parts to run smoothly and quietly.

In a further embodiment of the disclosure, the printer device can have a reinforcement feed device through which reinforcement material can be fed during the printing process.

This means that the concrete structure is not only made of concrete but also that other parts are enclosed in the concrete mass so that tensile forces can be better absorbed in the concrete structure.

Using the printer device described above, a method for creating a printer guide structure of a passenger transport system configured as an escalator or moving walkway can be carried out. In this case, a printer device for three-dimensional concrete printing is installed in an existing building. The printer device is introduced by arranging a printer guide device of the printer device between two support points of the building provided to support the passenger transport system. A 3D concrete printer device is connected to this printer guide device, which is displaceably guided along this printer guide device between the two support points. As soon as the printer device is set up and installed, it can be used to build a printer guide structure which extends between the two support points.

As already mentioned, at least part of the printer guide device can remain in the concrete structure as a reinforcement or part of the reinforcement by arranging it on the support points of the structure prior to the printing process with the remaining part of this printer guide device being set into the concrete structure during the printing process. This means that, for example, the entire printer guide device can form all or part of the reinforcement of the concrete structure. However, it can also be the case that only part of the printer guide device is enclosed by the concrete during the printing process as a reinforcement and that only this enclosed part serves as a reinforcement of the concrete structure. In this case, the rest of the printer guide device is separated from the enclosed parts of the printer guide device after the printing process and can, if necessary, be reused for a further printing process.

However, it may also be the case that no part of the printer guide device is enclosed in the concrete structure and is instead only used to guide the 3D concrete printer device between the two support points. In other words, the printer guide device of the printer device can only remain temporarily between the support locations in that it is aligned with the support locations prior to the printing operation when being arranged in the building and removed again after the printing operation.

As already mentioned, a pivot bearing can be formed at one of the two support locations and a sliding bearing at the other support location during the printing process on the concrete structure with each possibly including bearing components. In this context, however, additional components made of steel, for example, are not absolutely necessary. Depending on the printer program, the concrete quality and the specified reinforcement plan, the pivot bearing and the sliding bearing and the insertion of any reinforcement in the support points can be produced purely by the printing process.

The method preferably produces a concrete structure which has a U-shaped cross section that is open toward the top transversely to its longitudinal extension. In other words, such a concrete structure comprises two side walls which are connected to one another by a base. The printing process can be used, for example, to form guide elements in the side walls which are used to guide moving components of the passenger transport system. Likewise, fastening areas for components of the passenger transport system can be printed during the printing process, making it possible to embed in these fastening areas at least one fastening element, preferably made of metal or a polymer material. This fastening element can be a bolt, a threaded bolt, a tab, a lever, a rod, an anchor or the like.

If the printer device has a reinforcement feed device, reinforcement material can be fed through said device during the printing process. This reinforcement material can, for example, be reinforcement fibers made of steel or plastic. However, said material may also be wires which are introduced into the concrete material in a suitable and controlled manner. For this purpose, the reinforcement feed device preferably follows a reinforcement plan, which is implemented in the control software.

As soon as the concrete structure of the passenger transport system has been built by the printer device, the printer device can be dismantled and, after a corresponding setting time, the other components of the passenger transport system can be added to the concrete structure to produce the ready-to-use passenger transport system.

BRIEF DESCRIPTION OF THE DRAWINGS

Embodiments of the disclosure will be described in the following with reference to the accompanying drawings, although neither the drawings nor the description should be construed as limiting the disclosure. The drawings show the following.

DETAILED DESCRIPTION

Figure 1:
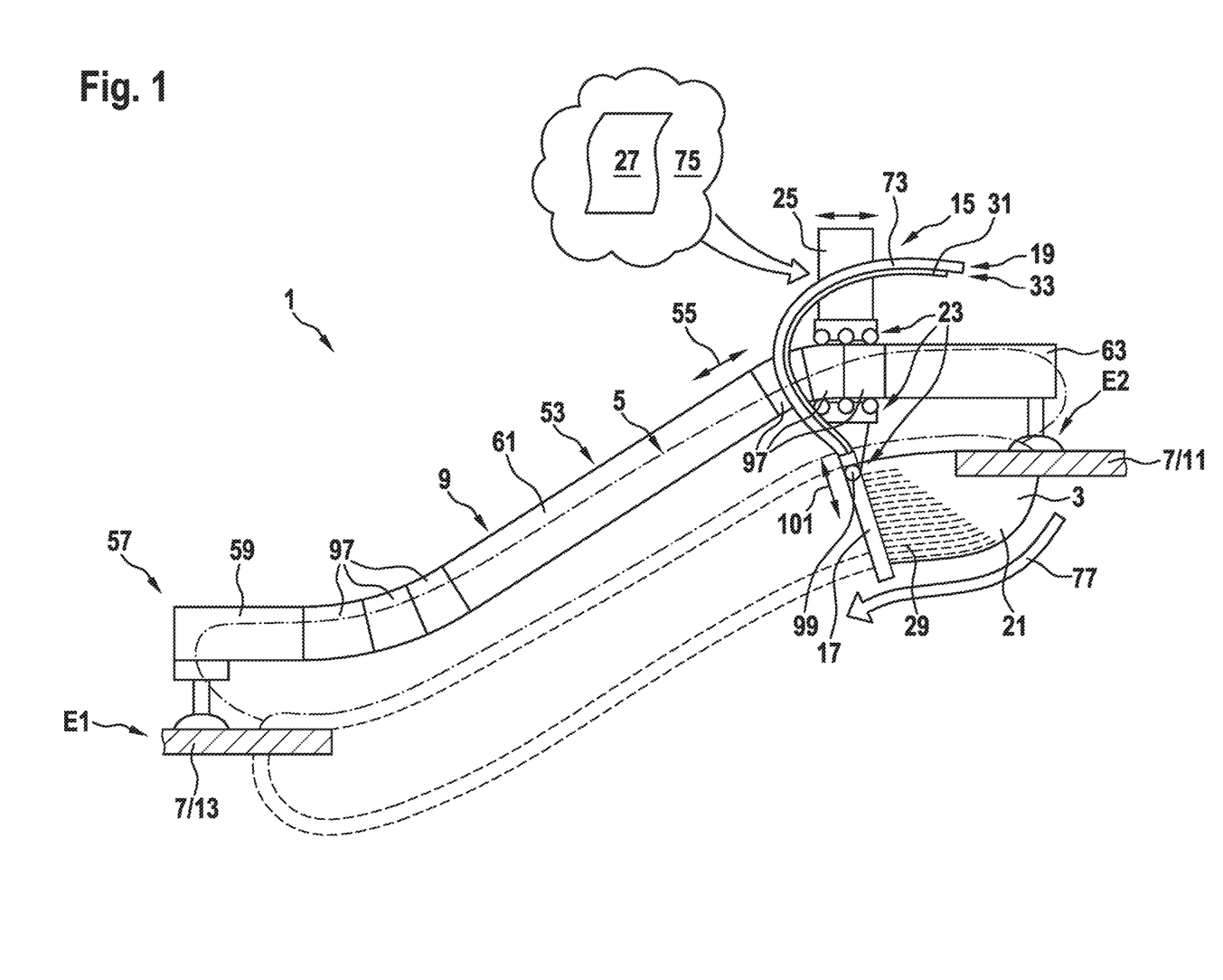
FIG. 1 schematically shows a printer device according to the disclosure with a printer guide device, a 3D concrete printer device and a reinforcement feed device.

FIG. 1 shows a printer device 1, according to the disclosure, with a printer guide device 9, a 3D concrete printing device 15 and a reinforcement feed device 31. Furthermore, FIG. 1 shows two floors E1, E2 of a building 7 arranged on different levels, which are to be connected to one another by a passenger transport system 5. This passenger transport system 5 is shown by means of a dash-dotted line because it has not yet been built. In order to build this passenger transport system 5, a load-bearing structure must be built between these two floors E1, E2. A concrete structure 3 is planned as the load-bearing structure.

In order to brace this printer guide structure 3 against gravity in the building 7, two support points 11, 13 are provided, which are formed on site on the floors E1, E2 of the building 7 that are arranged one above the other. As FIG. 1 shows, the printer guide device 9 is arranged between the two floors E1, E2 or between the support point 11 of the upper level E2 and the support point 13 of the lower level E1 in order to build the concrete structure 3 of the passenger transport system 5.

The printer guide device 9 has a support structure 57 on which at least one guide track 53 is formed. The shape of the load-bearing structure 57 in the side view shown in FIG. 1 approximately reflects the later course of the longitudinal extension of the concrete structure 3. For this purpose, the load-bearing structure 57 comprises a first section 59, a second section 61 and a third section 63 which are straight in their longitudinal extension and which can be connected to one another by means of angular segments 97. Depending on the number of angular segments 97 used, the serially connected sections 59, 61, 63 or their central longitudinal axes, not shown, can be set at an angle to one another. In other words, different slopes of the second section 61 can be selected depending on the number of angular segments 97 used. Furthermore, a set of sections 59, 61, 63 of different lengths can also be present in order to use them to construct a printer guide device 9 that is adapted to the conditions on site. In addition to providing the support and guide functions, both the sections 59, 61, 63 and the angular segments 97 thus also represent adjustment means so that the printer guide device 9 can be adjusted and aligned with the two support points 11, 13 that are arranged on different floors E1, E2 and thus be supported at these support points.

As already mentioned, the printer device 1 also comprises a 3D concrete printer device 15, which is guided on the printer guide device 9 so as to be displaceable along a guide path 55. The 3D concrete printer device 15 can be moved along the guide path 53 by means of a movement device 23.

The 3D concrete printer device 15 also comprises a printer nozzle 17. The printer nozzle 17 can be connected to a concrete conveyor 73 with processable concrete 19 being able to be fed to the printer nozzle 17 by means of said concrete conveyor 73. Only the hose of this concrete conveyor 73 is shown. It is usually connected to a transport vehicle, for example a truck, which transported the fresh concrete to the construction site. The printer nozzle 17 is also movably guided on the rest of the 3D concrete printer device 15 by means of the movement device 23 which is represented symbolically by the double arrow 101 and the pivoting mechanism 99.

The reinforcement supply device 31 is also connected to the printer nozzle 17 so that reinforcement parts 33 can be supplied. The printer nozzle 17 shown is described in more detail below in connection with FIGS. 5 and 6.

In order to coordinate the movements of the movement device 23 required for the printing process, the printer device 1 has a printer controller 25. The printer controller 25 executes control commands which are implemented in a control software 27. This control software 27 can be downloaded, for example, from a cloud 75. In this case, the control software 27 contains all movement sequences both of the 3D printer device 15 relative to the printer guide device 9 and the printer nozzle 17 relative to the rest of the 3D printer device 15. Furthermore, the printer controller 25 controls the supply of processable concrete 19 and reinforcement material 33 to the printer nozzle 17 according to the control software 27.

As shown in FIG. 1, the printer device 1 is in the middle of the process for building the printer guide structure 3. The part of the concrete structure 3 that has already been built is represented with a solid line while the part of the concrete structure 3 that has not yet been built is shown with a broken line. The part of the concrete structure 3 that has already been built shows the concrete 21 that has already been processed as well as the indicated reinforcement 29 that has already been installed and that was inserted in accordance with the printing process 77 that has already taken place.

Figure 2:
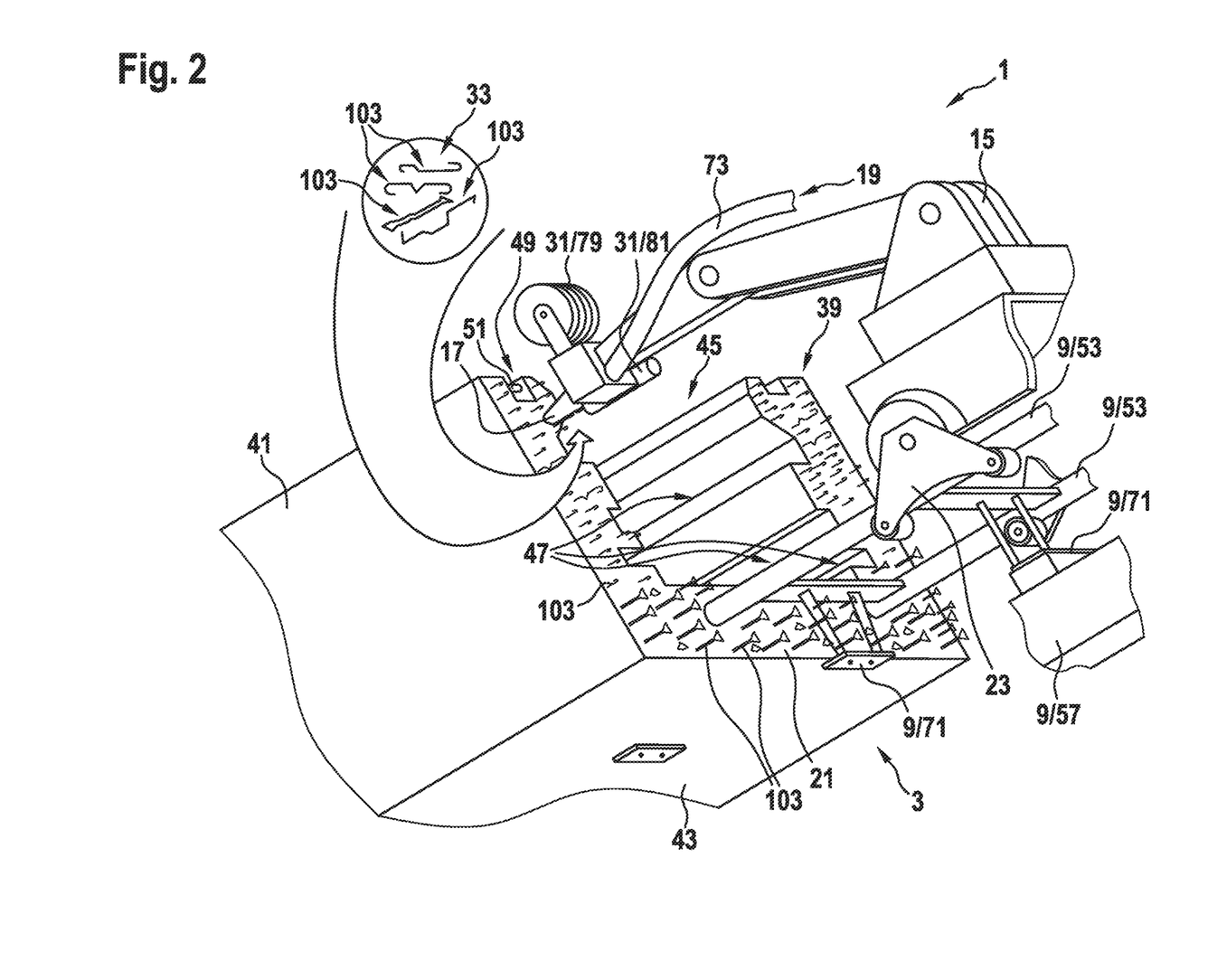
FIG. 2: schematically shows a section of a concrete structure during the printing process with a printer device.

FIG. 2 shows an alternative embodiment of the printer device 1. Its printer guide device 9 comprises a support structure 57 and two guide tracks 53, which are connected to the support structure 57 via connection points 71.

A 3D concrete printer device 15 is movably arranged and guided along the guide tracks 53 by means of a movement device. The 3D concrete printer device 15 is a converted industrial robot which is provided with further parts. These further parts are a printer nozzle 17 and a reinforcement feed device 31. The printer nozzle 17 is, in turn, connected to a concrete conveyor 73.

In contrast to the previous example in FIG. 1, the reinforcement material 33 is inserted into the processable concrete 19 not in the form of reinforcement wires but instead in the form of reinforcement fibers 103 as shown in the example in FIG. 2. The reinforcement feed device 31 continuously produces the reinforcement material 33 from semi-finished material 79 in the form of reinforcement fibers 103. In the present exemplary embodiment, the semi-finished material 79 is present in the form of wire wound on a wire reel, which is brought through the reinforcement feed device 31 in a suitable length and suitable shape. As shown, the reinforcement fibers 103 can take various shapes. This has the advantage that the shape and length of the reinforcement fibers 103 can be varied depending on the place of use. After the reinforcement material 33 has been cut to length and deformed, it is fed into a propulsion device 81 of the reinforcement supply device 31 and inserted into the soft concrete 21, which is still soft and was applied by the nozzle and/or applied at the right place and with the right propulsion energy. The movement device 23 as well as the 3D printer device 15 and the reinforcement feed device 31 are, in turn, controlled by a printer controller (not shown) and the respective control software.

The part of the printer guide structure 3 already produced by the printer device 1 comprises a U-shaped cross section 45. This cross section is formed by two side walls 41, 39, which are connected to one another by a base 43. As can be clearly seen, the two guide tracks 53 of the printer guide device 9 are enclosed during the printing process. After the complete construction of the concrete structure 3, the rest of the printer guide device 9, namely the load-bearing structure 57, can be detached by separating the connection points 71 from the concrete structure 3. Thus, part of the printer guide device 9 is part of the reinforcement material 33 of the finished concrete structure 3.

A particular advantage of printing the concrete structure 3 is that advantageous configurations of the concrete structure 3 can be printed at the same time. On the one hand, these may be free outer shapes of the base 43 and the side walls 39, 41, which can be freely shaped according to the architect's specifications. On the other hand, as shown in the present exemplary embodiment in FIG. 2, function-relevant contours, such as the guide elements 74 shown, can also be printed during the printing process. These guide elements 47 serve as guide rails for the step belt or pallet belt (not shown) of the passenger transport system 5 which can be arranged movably within the concrete structure 3. Fastening areas 49 can be printed as well. Fastening elements 51, to which further components of the passenger transport system 3 can be fastened, can be embedded in these fastening areas 49.

Figure 3:
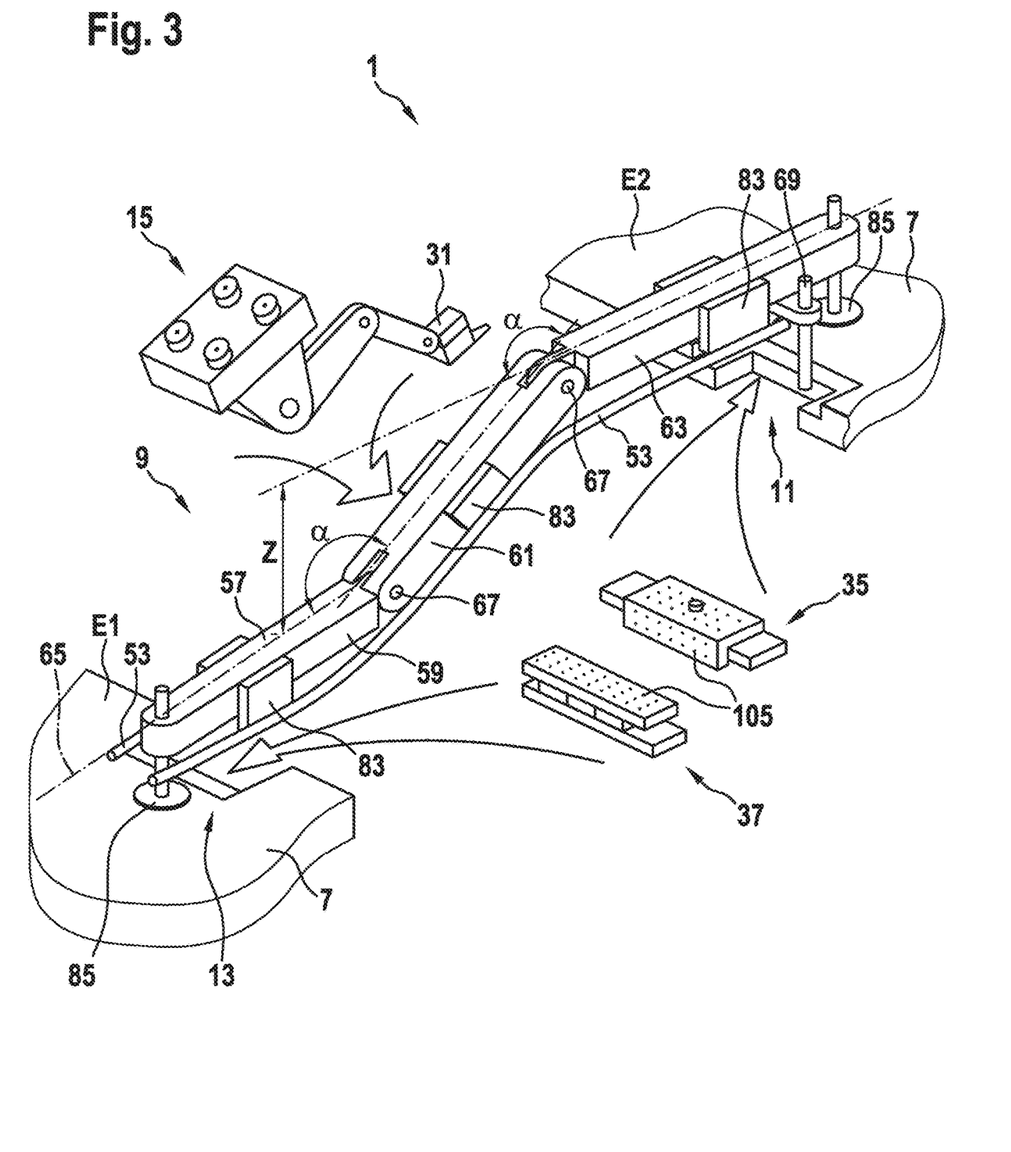
FIG. 3: schematically shows a printer guide device with a 3D concrete printer device that can be connected to the printer guide device.

FIG. 3 shows a further possible embodiment of the printer device 1. Again, two floors E1, E2 of the building 7 are shown. A support point 11, 13 is formed on each of these floors E1, E2. A printer guide device 9 of the printer device 1 is arranged between the two support points 13, 11. The printer guide device 9 is used to guide a 3D concrete printer device 15, which is part of the printer device 1 and which has already been described in detail in connection with FIG. 2. In contrast to the printer device 1 shown in FIG. 2, the 3D concrete printer device 15 in FIG. 3 is not guided on the printer guide device 9 in an "upright" position but rather in a "hanging" manner.

The printer guide device 9 comprises three sections 59, 61, 63. The first section 59 comprises a support 85 which is arranged on floor E1. The third section 63 also comprises a support 85, which is supported on the second floor E2 of the building 7. The first section 59 and the third section 63 are connected to one another via articulation points 67 by means of the second section 61. As a result, the difference in height between the floor E1 and the floor E2 can be adjusted on the printer guide device 9 as is symbolically represented by the height dimension Z. As shown by means of the central longitudinal axis of the printer guide device 9, the articulation points 67 enable an angular adjustment a of the second section 61 to the third section 63 and to the first section 59. This support structure of the printer guide device 9, which is formed by the sections 59, 61, 63 and the articulation points 67, supports the two guide tracks 53, which are adjustably fastened to the support structure 57 by means of adjusting brackets 83. Due to their functional characteristics, the adjustment brackets 83, the articulation points 67 and the supports 85 likewise represent adjustment means of the printer guide device 9.

Furthermore, the printer guide device 9 comprises a holder 69. This holder 69 is used to temporary hold bearing components 35, 37. In this case, the bearing component 35 is a pivot bearing, and the bearing component 37 is a sliding bearing. Having installed the two bearing components 35, 37, the concrete structure 3 (not shown) can move relative to the two floors E1, E2. In order to achieve a good anchoring of the bearing components 35, 37, these comprise holes which serve as connection points 105 to reinforcement parts 33, which can be fed by the reinforcement feed device 31 and inserted into these connection points 105.

As can be easily seen in FIG. 3, a printer guide device 9 is shown, which is set up before the printing process and can then be completely dismantled after the printer guide structure 3 has been built. Thus, no part of the printer guide device 9 remains as part of a reinforcement in the concrete structure 3 that has been built.

Figure 4:
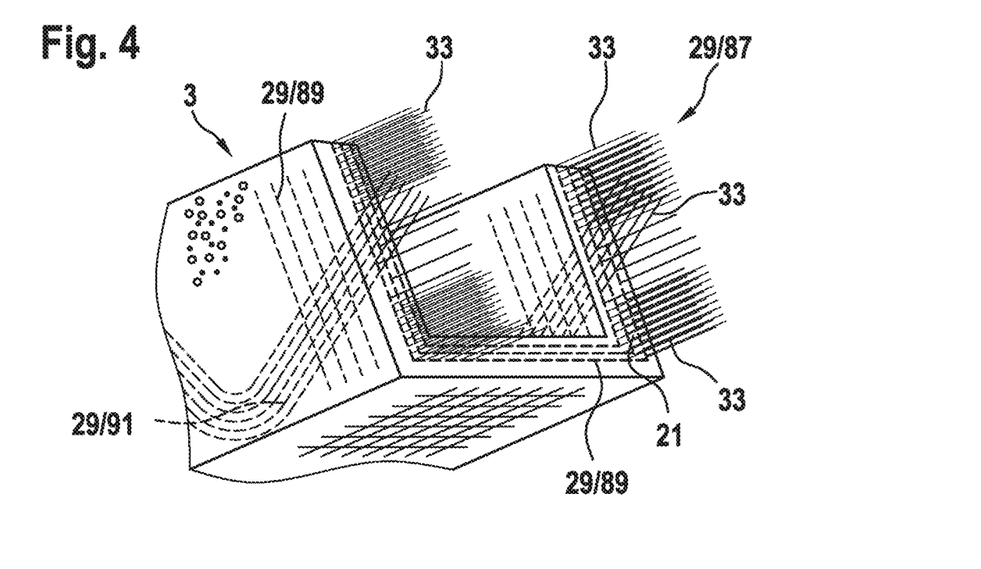
FIG. 4: schematically shows a section of a concrete structure with wires serving as a reinforcement, which were introduced into the concrete mass by a reinforcement feed device of the printer device in accordance with a reinforcement plan.

FIG. 4 shows a section of a printer guide structure 3, on the basis of which the insertion of reinforcement parts 33 is to be explained more clearly. The reinforcement 29, which is built into and embedded in the processed concrete 21, consists of differently guided reinforcement wires 87, 89, 91. The reinforcement wires 87 run parallel to the longitudinal extension of the concrete structure 3. In the orthogonal direction to these reinforcement wires 87, further reinforcement wires 89 are arranged in the concrete structure 3, which connect the longitudinal reinforcement wires 87 to one another. In order to be able to absorb shear stresses better, diagonally running reinforcement wires 91 are introduced into the concrete structure 3 during the printing process.

Figure 5:
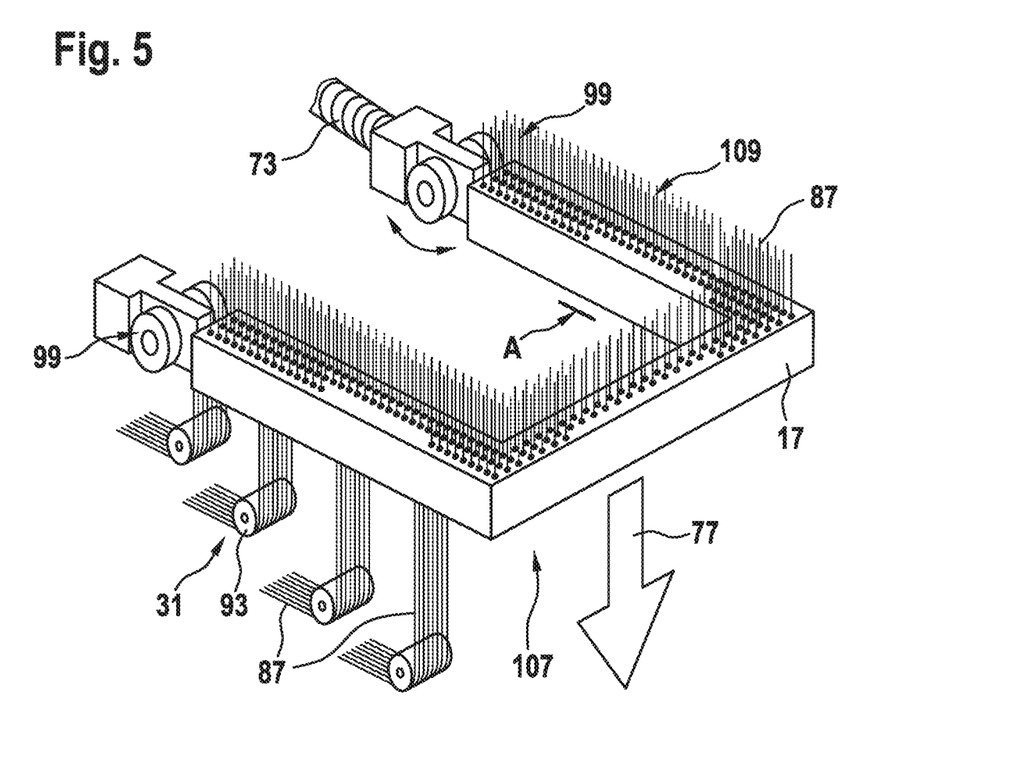
FIG. 5: schematically shows a possible embodiment of a nozzle with a reinforcement feed device that feeds reinforcement wires through the nozzle.

In order to produce the concrete structure 3 shown in FIG. 4, the 3D concrete printer device 15 shown in FIG. 1 can have a printer nozzle 17, as is shown schematically in FIG. 5. The printer nozzle 17 of FIG. 5 is U-shaped, as a result of which the U-shaped cross section of the printer guide structure 3 is produced. A hose of the concrete conveying device 73 through which processable concrete can be fed to the printer nozzle 17 is connected to the U-shaped printer nozzle 17. The printer nozzle 17 is pivotally supported by two pivot bearings 99 so that it can be pivoted in accordance with the printing process 77 specified by the control software 27 (see FIG. 1).

As shown by way of example in FIG. 4, the reinforcement wires 87, which are to be installed in the concrete structure 3 parallel to the longitudinal extension, are fed through the printer nozzle 17. These reinforcement wires 87 are fed to the reinforcement feed device 31, which is otherwise not shown, by means of wire guides 93. The reinforcement wires 87 enter the printer nozzle 17 at its front side 107 and, together with the processable concrete mass supplied by the concrete conveying device 73, emerge from the rear side 109 of the printer nozzle 17 and form the concrete structure 3 in accordance with the printing process 77. Due to the U-shaped configuration of the printer nozzle 17, smooth surfaces can be produced on the resulting concrete structure 3 during the printing process 77 so that no reworking of the surfaces is required. However, such a configuration of the printer nozzle 17 limits the design freedom of the surfaces and, in particular, the cross section of the concrete structure 3.

Figure 6:
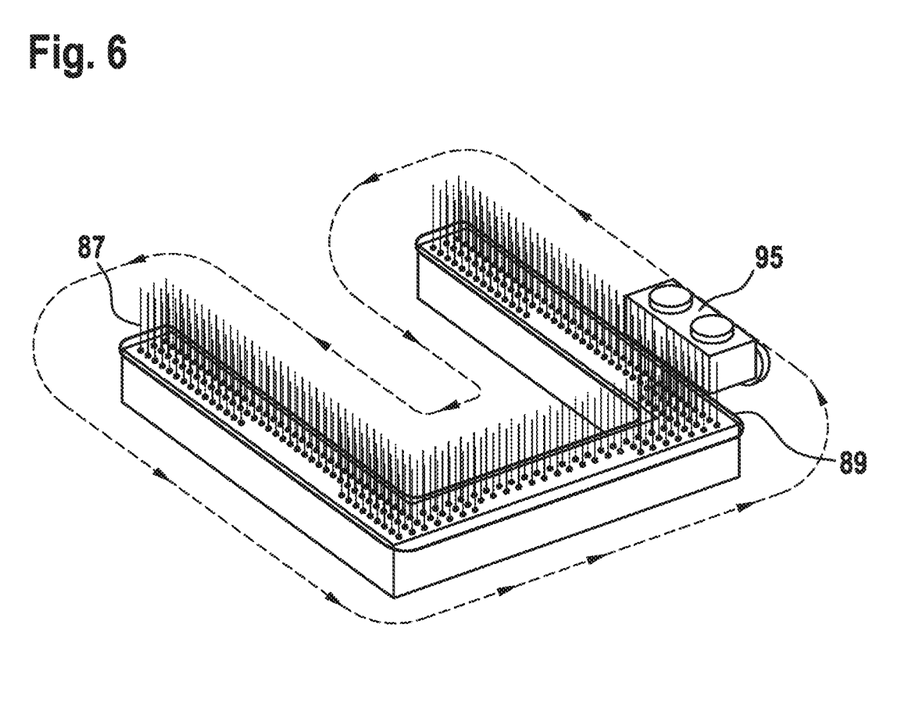
FIG. 6: schematically shows an addition to the reinforcement feed device shown in FIG. 5 so that reinforcement wires can not only be fed in the longitudinal extension of the concrete structure but also in the longitudinal direction in the processed concrete mass which can connect with other reinforcement wires in the transverse direction.

FIG. 6 schematically shows a possible feed unit 95 for reinforcement wires 89 which are to be arranged orthogonally to the reinforcement wires 87 introduced in the longitudinal direction. In this case, the feed unit 95, for example, periodically rotates about the U-shaped cross section and winds the reinforcement wire 89 around the reinforcement wires 87 introduced in the longitudinal direction.

Although FIGS. 1 to 6 show different aspects of the present disclosure on the basis of a concrete structure 3 to be built, which is intended to connect floors E1, E2, which are at a vertical distance from one another, it is obvious that the method steps described and a corresponding device are equally suitable for concrete structures to be arranged on one level, for example structures used for moving walkways. In addition, the printer device 1 can have further functional units such as, for example, a device for smoothing surfaces, by means of which the surfaces of the not yet set, processed concrete 21 of the printer guide structure 3 can be worked on.

Finally, it should be noted that terms such as "having," "comprising," etc., do not preclude other elements or steps and terms such as "a" or "an" do not preclude a plurality. Furthermore, it should be noted that features or steps that have been described with reference to one of the above exemplary embodiments can also be used in combination with other features or steps of other exemplary embodiments described above. Reference numerals in the claims are not to be interpreted as delimiting.

The invention claimed is:

1. A method for building a concrete structure of a passenger transport system configured as an escalator or moving walkway, wherein a printer device for three-dimensional concrete printing is introduced in an existing structure by:
    arranging a printer guide device of the printer device between two support points of a building provided for supporting the passenger transport system, wherein the printer guide device comprises at least:
        a first section,
        a second section,
        a third section,
        a first adjustment device coupling the first section to the second section, and
        a second adjustment device coupling the second section to the third section,
        wherein the first adjustment device and the second adjustment device each comprise one of: one or more angular segments or an articulation point;
    adjusting a slope of the second section of the printer guide device using the first adjustment device and the second adjustment device such that the first section of the printer guide device is aligned with a first of the two support points and the third section of the printer guide device is aligned with the a second of the two support points;
    arranging a 3D concrete printer apparatus on the printer guide device, which is guided along the printer guide device between the two support points; and
    building a concrete structure with the printer device and a printing process wherein said concrete structure extends between the two support points.

2. The method of claim 1, wherein at least part of the printer guide device remains as a reinforcement or part of the reinforcement in the concrete structure by arranging the at least part of the printer guide device that remains on the support points of the building before the printing process and the at least part of the printer guide device that remains is set into the concrete structure during the printing process.

3. The method of claim 1, wherein the printer guide device of the printer device only remains temporarily between the support points such that it is aligned with the support points when it is arranged in the existing structure before the printing process and removed again after the printing process.

4. The method of claim 1, wherein a pivot bearing is formed on the concrete structure at one of the two support points and a sliding bearing is formed at the other support point during the printing process.

5. The method of claim 1, wherein the concrete structure comprises a U-shaped cross section with two side walls and a base and wherein guide elements for movable components of the passenger transport system are formed in the side walls during the printing process.

6. The method of claim 1, wherein fastening areas for components of the passenger transport system are also printed, wherein at least one fastener is brought into these fastening areas during the printing process.

7. The method of claim 1, wherein reinforcement material is supplied by means of a reinforcement feed device of the printer device during the printing process.

8. The method of claim 1, wherein adjusting the slope of the second section of the printer guide device using the first adjustment device or the second adjustment device comprises selecting a number of the one or more angular segments to use.

9. The method of claim 1, wherein adjusting the slope of the second section of the printer guide device using the first adjustment device or the second adjustment device comprises adjusting the articulation point.

\* \* \* \* \*